(12) United States Patent
Salkala

(10) Patent No.: US 9,020,140 B2
(45) Date of Patent: Apr. 28, 2015

(54) TELEPHONIC TELESERVICES MANAGEMENT

(71) Applicant: SAP AG, Walldorf (DE)

(72) Inventor: Ville Salkala, Klaukkala (FI)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/669,127

(22) Filed: Nov. 5, 2012

(65) Prior Publication Data

US 2014/0126712 A1     May 8, 2014

(51) Int. Cl.
    *H04M 3/00*     (2006.01)
    *H04M 5/00*     (2006.01)
    *H04M 3/51*     (2006.01)

(52) U.S. Cl.
    CPC .................................. *H04M 3/5158* (2013.01)

(58) Field of Classification Search
    CPC ... H04M 3/5232; H04M 3/51; H04M 3/5141; H04M 3/5158; H04M 3/5183
    USPC ............. 379/265.01, 265.02, 266.01, 266.07, 379/265.04, 265.11
    See application file for complete search history.

(56) References Cited

U.S. PATENT DOCUMENTS

| | | | | |
|---|---|---|---|---|
| 5,073,890 A | * | 12/1991 | Danielsen | 370/270 |
| 5,553,133 A | * | 9/1996 | Perkins | 379/266.08 |
| 5,815,566 A | * | 9/1998 | Ramot et al. | 379/210.01 |
| 7,372,956 B1 | * | 5/2008 | Kikinis et al. | 379/265.01 |
| 8,280,031 B2 | * | 10/2012 | Segall et al. | 379/266.07 |
| 2003/0007612 A1 | * | 1/2003 | Garcia | 379/88.18 |
| 2004/0133434 A1 | * | 7/2004 | Szlam et al. | 705/1 |
| 2007/0160188 A1 | * | 7/2007 | Sharpe et al. | 379/265.01 |
| 2010/0303225 A1 | | 12/2010 | Shashkov et al. | |
| 2012/0099720 A1 | * | 4/2012 | Soundar | 379/265.02 |

FOREIGN PATENT DOCUMENTS

WO     WO-2007137575 A1     12/2007

OTHER PUBLICATIONS

"European Application Serial No. 13191633.0, Search Report mailed Feb. 21, 2014", 6 pgs.

* cited by examiner

*Primary Examiner* — Oleg Asanbayev
(74) *Attorney, Agent, or Firm* — Schwegman Lundberg & Woessner, P.A.

(57) ABSTRACT

A system and method to provide telephonic teleservices management is provided. The system may comprise a session management module used to establish a session with an agent via a telephone of the agent. An agent management module may manage a work state of the agent within a plurality of sequential calls between the agent and a plurality of customers. During the session, the connection with the agent remains established between each of the sequential calls. A hub management module manages a call hub during a call of the plurality of sequential calls between the agent and a customer of the plurality of customers.

16 Claims, 8 Drawing Sheets

TELEPHONIC TELESERVICES MANAGEMENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2012, SAP AG, All Rights Reserved.

TECHNICAL FIELD

This patent document pertains generally to networked communications, and more particularly, but not by way of limitation, to technology agnostic telesales management.

BACKGROUND

The provisioning of teleservices is a growing industry. Teleservices are services provided to customers, clients, potential customers, customer representatives or other people by an entity (e.g., a corporation, a government, or a person) via a telephone. The services may include marketing pitches, sales calls, customer services, bill collection, or the like. In some instances, the calls are initiated by the entity providing the service, and in other instances, the calls are initiated by the person receiving the service.

Some teleservice representatives may work from their home or away from a central office. These teleservice representatives may not have access to sophisticated data networks that can provide a required quality of service or meet security requirements. The home-based teleservice representatives typically require a dedicated telephone or voice connection and a personal computer. The maintenance and information technology (IT) support required to maintain such equipment over a large geographical area is expensive and time-consuming.

BRIEF DESCRIPTION OF DRAWINGS

Some embodiments are illustrated by way of example and not limitation in the figures of the accompanying drawings in which.

DETAILED DESCRIPTION

Figure 1:
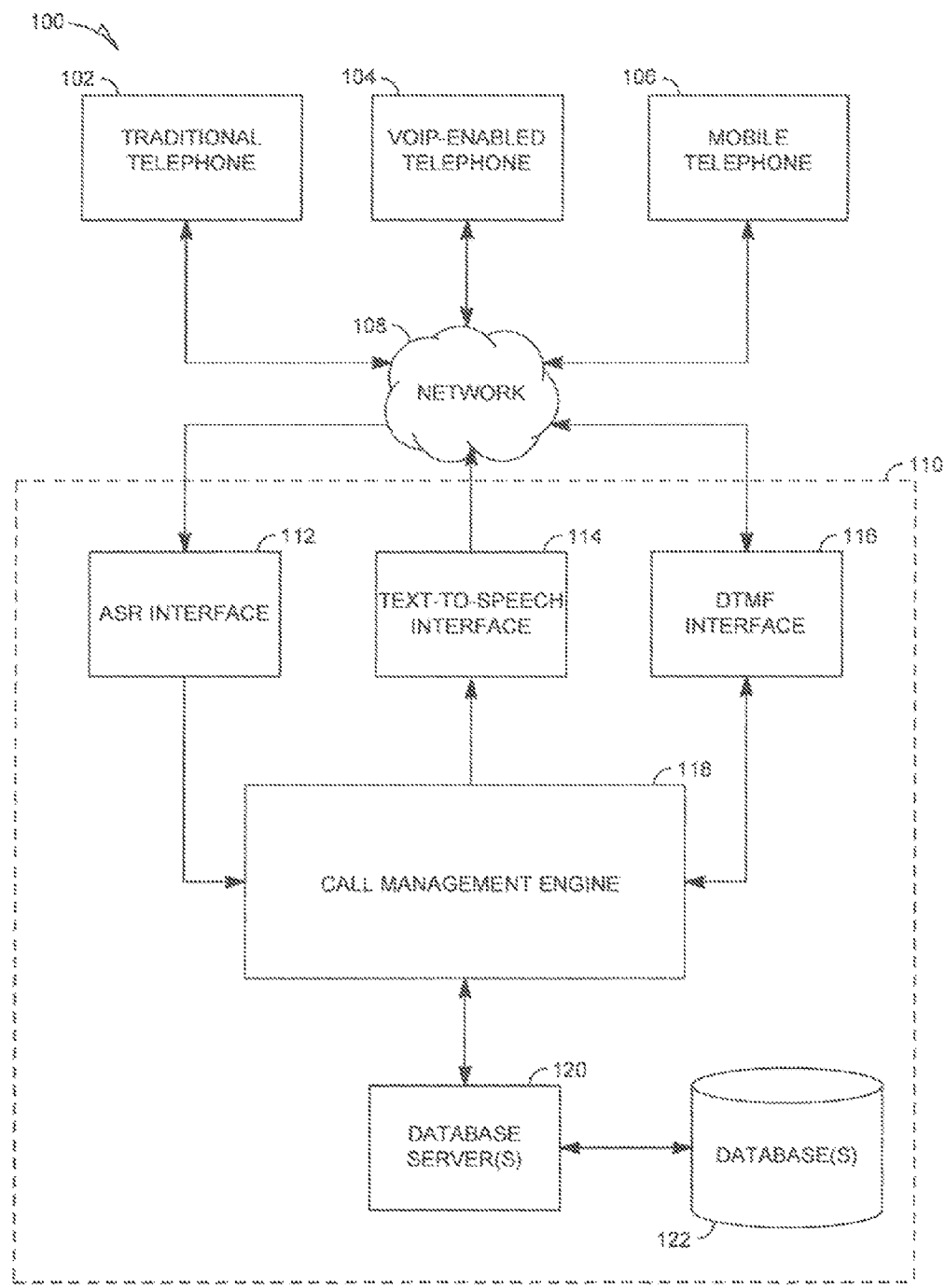
FIG. 1 is a diagram of an example networked environment in which various embodiments may be practiced.

In the following description, for purposes of explanation, numerous specific details are set forth in order to provide a thorough understanding of some example embodiments. It will be evident, however, to one skilled in the art that the present invention may be practiced without these specific details.

Teleservice agents stationed at various geographical locations may provide teleservices to customers over the telephone. The teleservice agents may, for example, work from their respective homes. The systems and methods described herein are technology agnostic as to the technology used by the teleservice agent. The teleservice agent may use various combinations of technology, such as a traditional telephone, a voice over Internet protocol (VOIP)-enabled telephone, a mobile telephone, or another device that is capable of transmitting and receiving voice data and touch-tone (e.g., dual-tone multi-frequency signaling (DTMF)) data. The teleservice agent may or may not have access to a second device, such as a computer.

Using the described systems and methods, the teleservice agent is able to be joined to a campaign, conduct multiple calls with customers within the campaign, and report the outcome of the calls without ending the session by, for example, hanging up the telephone. In addition, the session with the teleservice agent may assure that user does not accidentally receive any other calls during the session. If the calls are made over public telephone network, some embodiments may reduce or avoid the possible call set-up fees since the set-up is performed only once and the teleservice agent does not dial in for each separate customer call.

Thus, in an example embodiment, the teleservice agent's session with the call center persists while the call center (e.g., teleservice provider or call management engine) manages calls (connecting calls and terminating calls) with customers. During a particular session, the call center may connect and disconnect a plurality of sequential calls with a plurality of individual customers. The calls may be connected to the session one by one so that the teleservice agent may interact with each individual customer. The session of the teleservice agent persists after each call with a customer is terminated.

As used herein, a campaign refers to the task assigned to the teleservice agent. A campaign may be a marketing pitch, a survey to be conducted, a customer service to be provided, or the like. A number of teleservice agents may be assigned to a campaign. The term session is used herein to refer to a connection established, over a communication network, between the teleservice agent and the teleservice provider (e.g., an employer of the teleservice agent such as a marketing firm, an entity providing customer services, or the like). A call, as used herein, refers to a connection established between a customer and the teleservice provider. During a call, the teleservice agent may interact directly with the customer using the systems and methods described herein.

FIG. 1 is a diagram of an example networked environment 100 in which various embodiments may be practiced. The networked environment 100 includes one or more telephones used by teleservice agents and customers to access the teleservice provider 110 via a communications network 108. The telephones may include traditional telephones 102 operating over a network 108 such as a publicly switched telephone network (PSTN) or a plain old telephone system (POTS) network. The telephones may be VOIP-enabled telephones 104 operating over a network 108 according to the Internet protocol. The telephones may also be mobile telephones 106 operating over a network 108 such as a cellular network or wireless data network. Examples of cellular network technologies include, but are not limited to, Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/ TDMA), and Integrated Digital Enhanced Network (IDEN). Additional telephone systems, such as satellite telephone systems, may be used by teleservice agents or by customers to access the teleservice provider 110. Other voice-enabled technologies, such as ham radio, may also be used to access the teleservice provider 110.

The teleservice provider 110 facilitates communications between the teleservice agents and the customers. The teleservice provider 110 includes one or more interfaces that translate and communicate data between the telephones and a call management engine 118. The interfaces may include, for example, an automatic speech recognition (ASR) interface 112, a text-to-speech interface 114 (e.g., an IVR interface), and a DTMF interface 116. The ASR interface 112 and the DTMF interface 116 may include various gateways (such as PSTN, IP, or cellular gateways) to access the network 108. In some instances, the DTMF interface 116 may be used to initiate calls or sessions with the telephones by providing a telephone number of a targeted telephone.

The call management engine 118 manages the teleservices provided to the customers and the teleservice agents. The call management engine 118 may use various conference calling technologies to manage the sessions of the teleservice agents and the calls of the customers. In some instances, the call management engine 118 may implement an IP Multimedia Subsystem (IMS) to manage connections with the teleservice agents and the customers. The call management engine 118 is, in turn, shown to be coupled to one or more databases servers 120 that facilitate access to one or more databases 122. Further, while the environment 100 shown in FIG. 1 employs a client-server architecture, the present invention is of course not limited to such an architecture, and could equally well find application in a distributed, or peer-to-peer, architecture system, for example.

Figure 2:
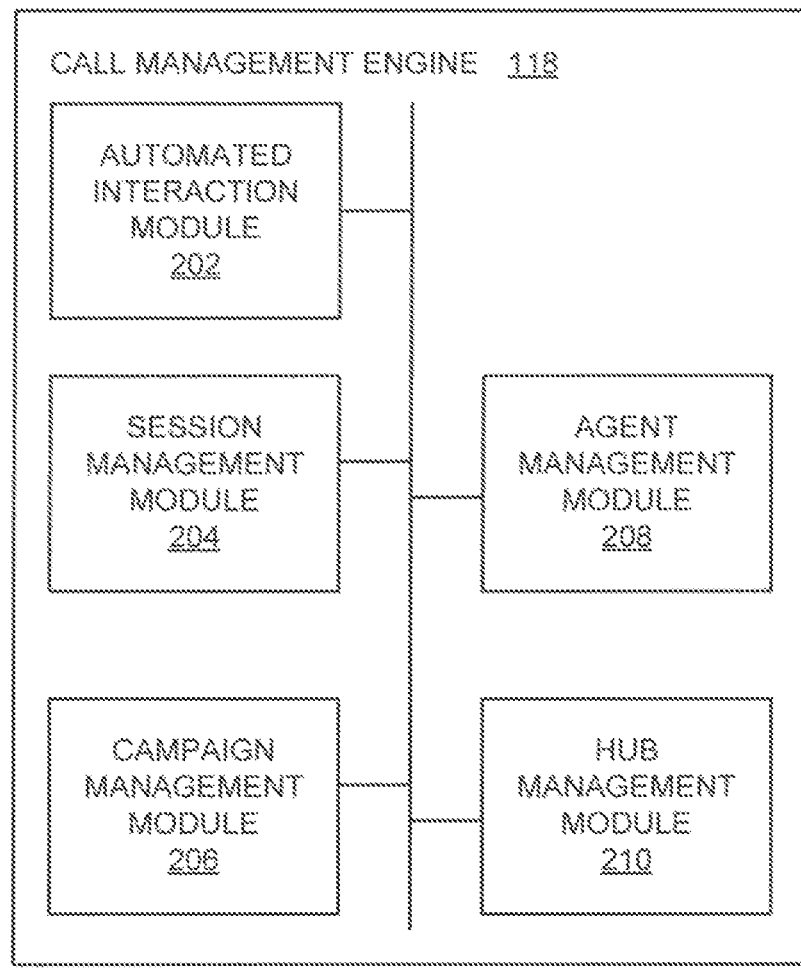
FIG. 2 is a block diagram illustrating a call management engine, according to example embodiment.

FIG. 2 is a block diagram illustrating a call management engine 118, according to example embodiment. The call management engine 118 may include one or more hardware-implemented modules or software modules.

An automated interaction module 202 is configured to manage electronic communications between the remaining modules of the call management engine 118 and the ASR interface 112 and the DTMF interface 116. The automated interaction module 202 may receive voice or DTMF commands or responses from a telephone and translate the voice commands into machine-readable commands or responses that can be processed by one or more of the remaining modules. Similarly, the automated interaction module 202 may receive machine-readable commands or responses from the remaining modules and translate them into voice or DTMF commands or responses. The automated interaction module 202 may provide, in connection with the other modules, interactive voice response (IVR) functionality using the text-to-speech interface 114. IVR is used by teleservice providers to audibly prompt the user (e.g., a customer or teleservice agent) for certain information to, for example, identify the user, route the user, receive selections from the user, or perform other tasks.

A session management module 204 manages sessions between the teleservice agent and the teleservice provider 110. The session management module 204 may initiate a session with the teleservice agent by dialing the telephone of the teleservice agent. In instances where the establishment of the session with the teleservice agent fails (e.g., if the teleservice agent's line is busy or the teleservice agent fails to answer the telephone), the session management module 204 is configured to re-initiate the session (e.g., re-dial the telephone number of the teleservice agent) at a pre-defined interval for a pre-defined number of times or over a pre-defined interval. To illustrate, the session management module 204 may re-initiate the session every 2 minutes ten times or every 2 minutes over a 20-minute period.

In other embodiments, the session management module 204 may receive a session initiation (e.g., from the telephone of the teleservice agent). The session management module 204 may identify the teleservice agent using, for example, caller identification, a teleservice agent identifier received via the DTMF interface 116, or voice commands received via the ASR interface 112. The session management module 204 may use IVR to request voice or DTMF data from the teleservice agent in order to identify the teleservice agent.

The session management module 204 may terminate a session established with a teleservice agent. The session may be terminated when the teleservice agent's shift is finished (e.g., after a predefined period or a predefined number of calls).

A campaign management module 206 is configured to manage participants in a campaign. The participants include teleservice agents and customers. A teleservice agent is assigned to one or more campaigns within a session. The campaign management module 206 removes the teleservice agent from a first campaign and adds the teleservice agent to a second campaign.

In the campaign management module 206, each customer call is handled as an individual phone call. The campaign management module 206 may use internal join and un-join operations for connecting customer call to agent session. This functionality can be achieved, e.g., with conferencing technology so that teleservice agent and the customer are included in the conference as conference participants. Customer calls may be accepted one at the time into the conference with the teleservice agent remaining in the conference between calls. This approach may allow more efficient joining operations inside the server infrastructure instead of end-to-end call set up or end-to-end call transfer mechanisms. In addition, the teleservice agent may be able to route the customer to a voice menu that uses IVR or other automated service to receive an automatic announcement, to participate in a survey, or to perform another operation within the campaign or in another campaign.

In embodiments where the calls to the customers are initiated by the teleservice provider 110, the agent session status is derived from active calls. Thus the agent pool status is updated based on call status so that an agent pool capacity (e.g., a number of agents in the campaign that are in an inactive call) is incremented when a call is connected and the pool capacity is decremented if the call is disconnected. This method may be used to improve an outbound dialing algorithm based on attributes like the size of the pool, average call duration, and success probability of the customer call. In some instances, efficiency can be further improved by using live customer call detection (e.g., via the ASR interface 112). As an end result, the call waiting time for the teleservice agent may be decreased and the customer may experience a shortened delay in the agent response time.

To implement a campaign, the campaign management module 206 assigns customer contacts into calling lists. Calling lists are managed inside the campaign. The campaign, or a description of the campaign, includes definitions of rules for starting and ending the campaign. The campaign, or the description of the campaign, may contain other attributes such as dialing mode and transcripts. The campaign, or the description of the campaign, may further identify the agent group (or agent calling list) assigned to the campaign.

The campaign management module 206 manages a list of defined campaigns and initiates the respective campaigns based on campaign rules. A campaign begins by dialing to selected teleservice agents to establish the session with the teleservice agents. When a threshold number of sessions with teleservice agents are established, the campaign management module 206 may start to initiate calls to customers. As soon as the call is connected to the customer, the call may be joined into an agent session. When the call and the session are joined, the agent and the customer are able to interact.

An agent management module 308 manages agent work states within a call with the customer. The agent work states define that task to be completed by the agent at a particular time based on the status of the call with the customer. Example work states may include, for example, "agent not ready", "agent ready", "preview", "engaged with customer", and "wrap up".

An "agent not ready" state initially occurs as soon as the agent has accepted the session and the system connects the agent into the IVR service. In this state, the agent has access to personal settings and campaign data provided via the ASR interface 112 to provide, for example, the option to review the transcript of the particular campaign. Optionally, the teleservice provider may send transcripts to the agent using SMS, mobile push, or other similar service. The agent may schedule a break from the service, e.g., the agent will drop out from the session for a lunch period by selecting lunch break option. System shall invite agent into the service after the break ends (re-call function in session establishment). Breaks may be enforced by administrator and that way system may have inbuilt workforce and shift planning capabilities and automation.

An "agent ready" state occurs when an agent indicates that he is ready to take calls from customers. During this state, the call management engine 118 starts to connect live customer calls to the agent.

A "preview" state allows the agent to preview customer data before being connected to a call. The call management engine 118 may place a call to the customer after the preview state is ended. In some instances, the agent may be connected to the customer call without any preview state.

An "engaged with customer" state occurs when the agent is connected to the call with the customer. Since the agent is handling multiple customer interactions within the same call, the agent is notified about the state transitions. For example, the customer name may be announced to the agent and the connection to the call is indicated using sound effects. The agent might toggle the customer in mute state or utilize another function (initiated by, e.g., a DTMF input or ASR input) during the customer interaction while still able to hear customer talking.

A "wrap up" state occurs after the call with the customer is disconnected from the agent either because the call is ended or because the customer call is allocated to another agent within the teleservice. In the "wrap up" state, the agent may be provided a voice menu for selecting the end results of the disconnected call. The voice menu content (script) may be specified in campaign settings.

A hub management module 210 is configured to manage the call between the agent and the customer. The hub management module 210 manages the conference hub, ASR or IVR capabilities, and allows a manager or other third party to join the call.

The agent and customer can interact with one another once the customer call and the agent calls are connected into a conversation hub. A conversation hub is a temporary context that is created when agent and customer are joined. The hub is removed after customer call ends. The agent can command the hub using an IVR instance reserved for agent that receives commands from agent. The customer has access to a separate IVR instance that may automatically monitor the customer's speech to recognize network originated messages or other automated messages. The customer may also receive voice dialogs that are launched by the agent (from the agent's IVR instance). Thus the customer IVR instance and the agent IVR instance may work in conjunction using the conversation hub as a routing point. The conversation hub may also contain conference type of function which is facilitated by a media mixer resource reserved for the hub. For example, a conferencing function may be used if there is a need to connect a supervisor participant into the conversation hub.

Figure 3:
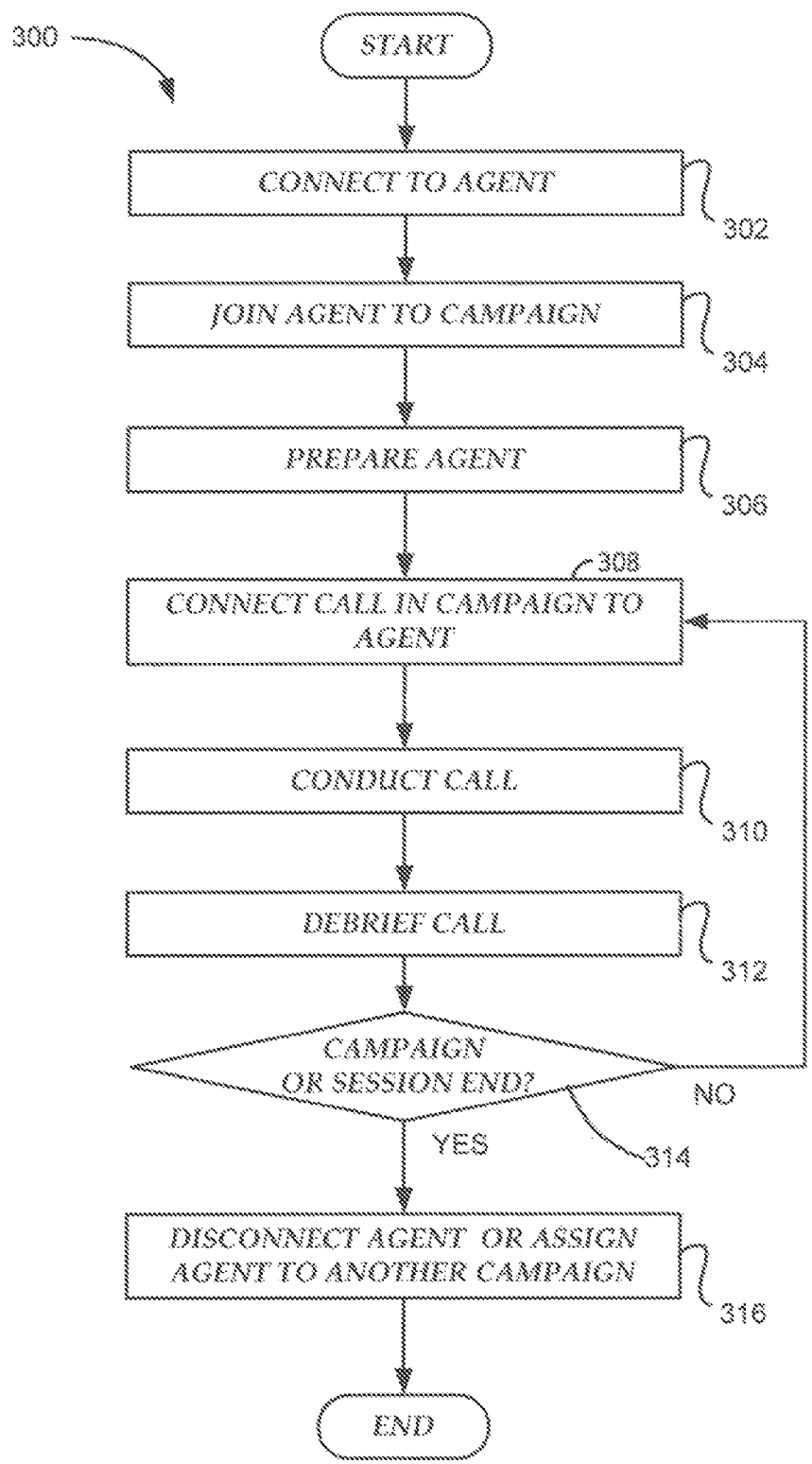
FIG. 3 is a flowchart illustrating a method to manage a teleservice agent assigned to a campaign, according to an example embodiment.

FIG. 3 is a flowchart illustrating a method 300 to manage a teleservice agent assigned to a campaign, according to an example embodiment. The method 300 may performed, for example, by the call management engine 118.

In an operation 302, a connection between the teleservice agent and the call management engine 118 is established. The connection is referred to as a "session" between the agent and the call management engine 118. The connection may be performed by the call management engine 118 by placing a voice call to the agent and the agent accepting the voice call.

In an operation 304, the agent in the session is joined to a campaign. The campaign defines the tasks to be performed by the agent while the agent is taking calls with customers. If the agent's session outlasts the duration of a campaign, the agent may be later assigned to second campaign (not shown).

In an operation 306, the agent is prepared to join the call. The preparation may include a description of the campaign, a script for the agent to follow, or some other information about the campaign.

In an operation 308, the prepared agent is connected to a call with a customer who is part of the campaign. The campaign may include calls made to customers or calls made by customers to the teleservice. The customer may be joined to the campaign based on a telephone number dialed by the customer, answers to a series of questions asked to the user before being connected to an agent via, for example, IVR, DTMF, and/or ASR interfaces. The call may be connected to the agent's session using, for example, teleconferencing techniques.

In an operation 310, the agent and the customer conduct the call. The call may include the agent and the customer speaking directly, the agent managing an IVR system where the customer's input is received via a DTMF or ASR interface, or some combination thereof.

In an operation 312, after the call between the customer and the agent is completed, the agent debriefs the call using voice (ASR) commands or DTMF commands. The debriefing may include reporting an outcome of the call, such as a sales order, or reporting next steps to take with the customer, e.g. schedule a service visit.

In an operation 314, a determination is made as to whether the campaign or the session is ended. If the campaign has not ended, the agent is connected to another call in the campaign (operation 308). If the campaign is over, in an operation 316, the session with the agent is disconnected (e.g., the agent's work shift is over) or the agent is assigned to a different campaign.

Figure 4:
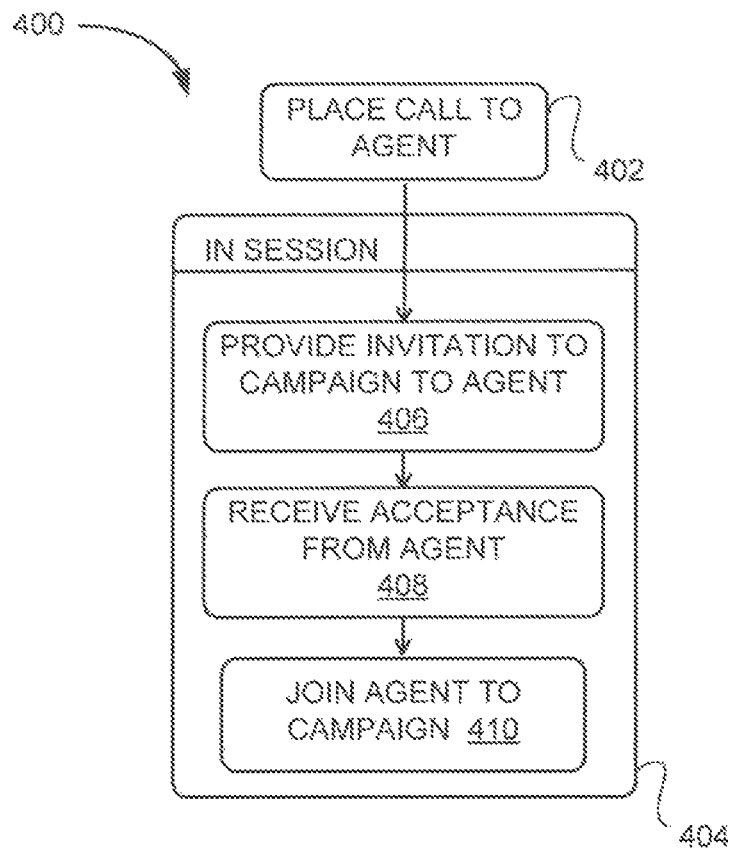
FIG. 4 is a flowchart illustrating a method to join an agent to a campaign, according to an example embodiment.

FIG. 4 is a flowchart illustrating a method 400 to join an agent to a campaign, according to an example embodiment. The method 400 may be performed, for example, by the session management module 204 or the campaign management module 206.

In an operation 402, a voice call or communication is placed by the call management engine 118 to the telephone (e.g., traditional telephone 102, VOIP-enabled telephone 104, or mobile telephone 106) of the agent to establish a session between the call management engine 118 and the agent. In some instances, the agent may initiate the call to the call management engine 118.

During a session 404 between the agent and the call management engine 118, the campaign management module 206 may invite the agent to join a particular campaign. In some instances, the agent may be allowed to choose which campaign to join from a number of available campaigns.

Further during the session 404, in an operation 408, the agent accepts the campaign to which he is assigned. In an operation 410, the agent is joined to the campaign.

Figure 5:
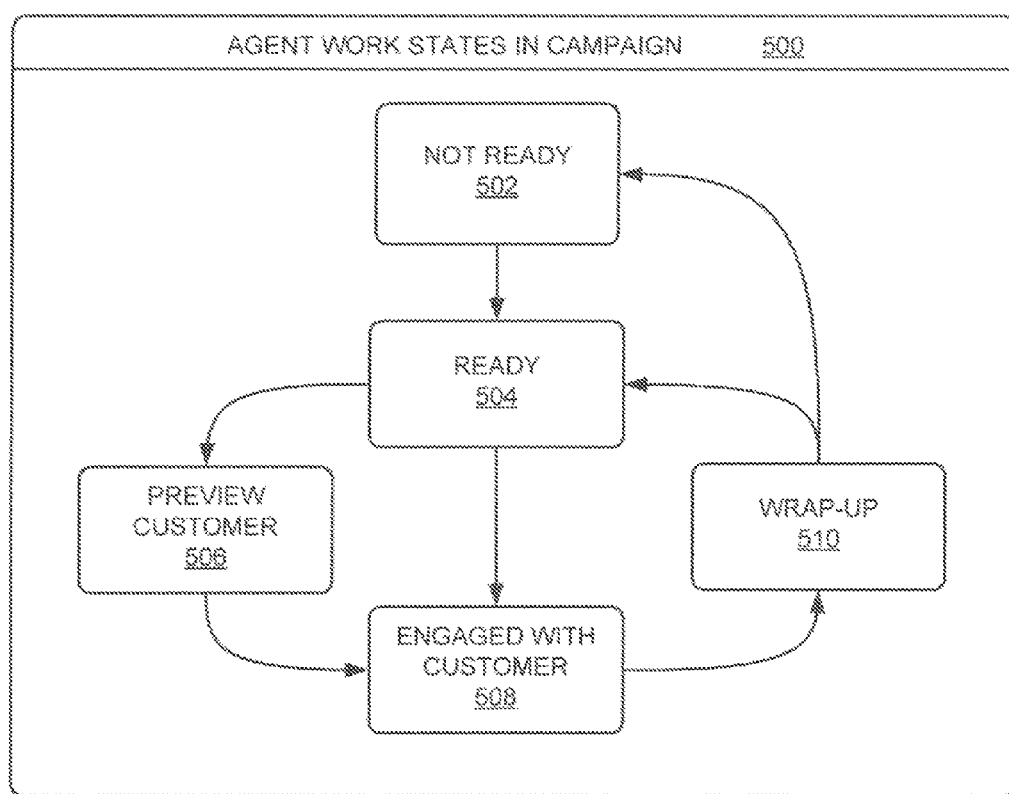
FIG. 5 is a diagram illustrating example agent work states during a session, according to an example embodiment.

FIG. 5 is a diagram illustrating example agent work states 500 during a session, according to an example embodiment. The agent work states may be managed by the agent management module 208.

In a "not ready" state 502, the agent may be able to modify personal settings, receive information about the campaign, or disconnect from the session for a scheduled break, for example.

From the "not ready" state, the agent progresses to a "ready" state 504 where the agent is available to take calls with customers. From the "ready" state, the agent may progress to a "preview customer" state 506 or an "engaged with customer" state. If the agent goes to a "preview customer" state 506, the agent proceeds to the "engaged with customer" state 508 after receiving information about the customer.

After being engaged with a customer, the agent proceeds to a "wrap-up" state 510 where the agent debriefs from the completed call. After wrapping up, the agent may return to the "ready" state 504 to take another customer call or, if the campaign or session is over, the agent may proceed to the "not ready" state 502.

Figure 6:
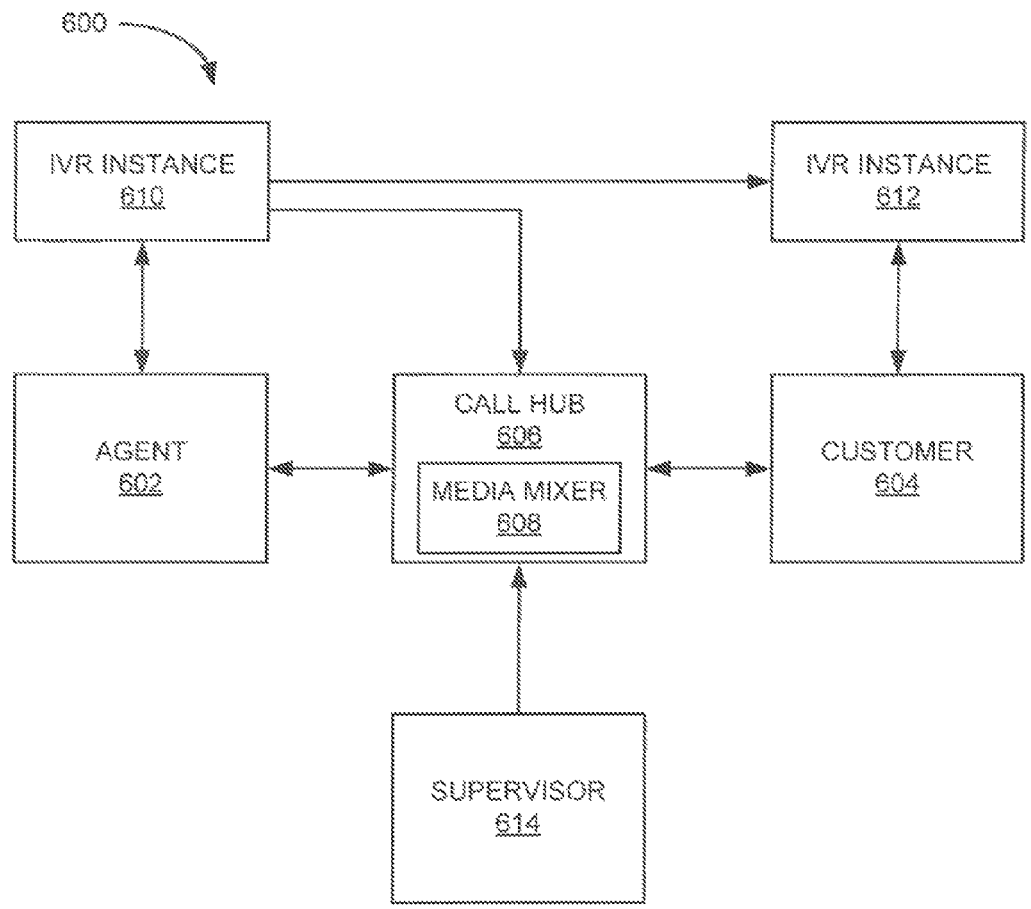
FIG. 6 is a diagram illustrating a call hub during a call, according to an example embodiment.

FIG. 6 is a diagram 600 illustrating a call hub 606 during a call, according to an example embodiment. The call hub 606 may be managed by the hub management module 210.

The initial participants who interact within the call hub 606 are the agent 602 (in the "engaged with customer" state) and the customer. The call hub 606 may be an instance of a teleconference managed by the call management engine 118. The call hub 606 may include a media mixer 608 that is configured to provide further conferencing function to, for example, join additional participants (e.g., a supervisor 614) to the call hub.

While interacting via the call hub 606, the agent 602 has access to an IVR instance and/or an ASR instance that can join the meeting as needed or requested. The customer 604 also has access to a designated IVR instance 612 that can communicate with the customer during the call.

Figure 7:
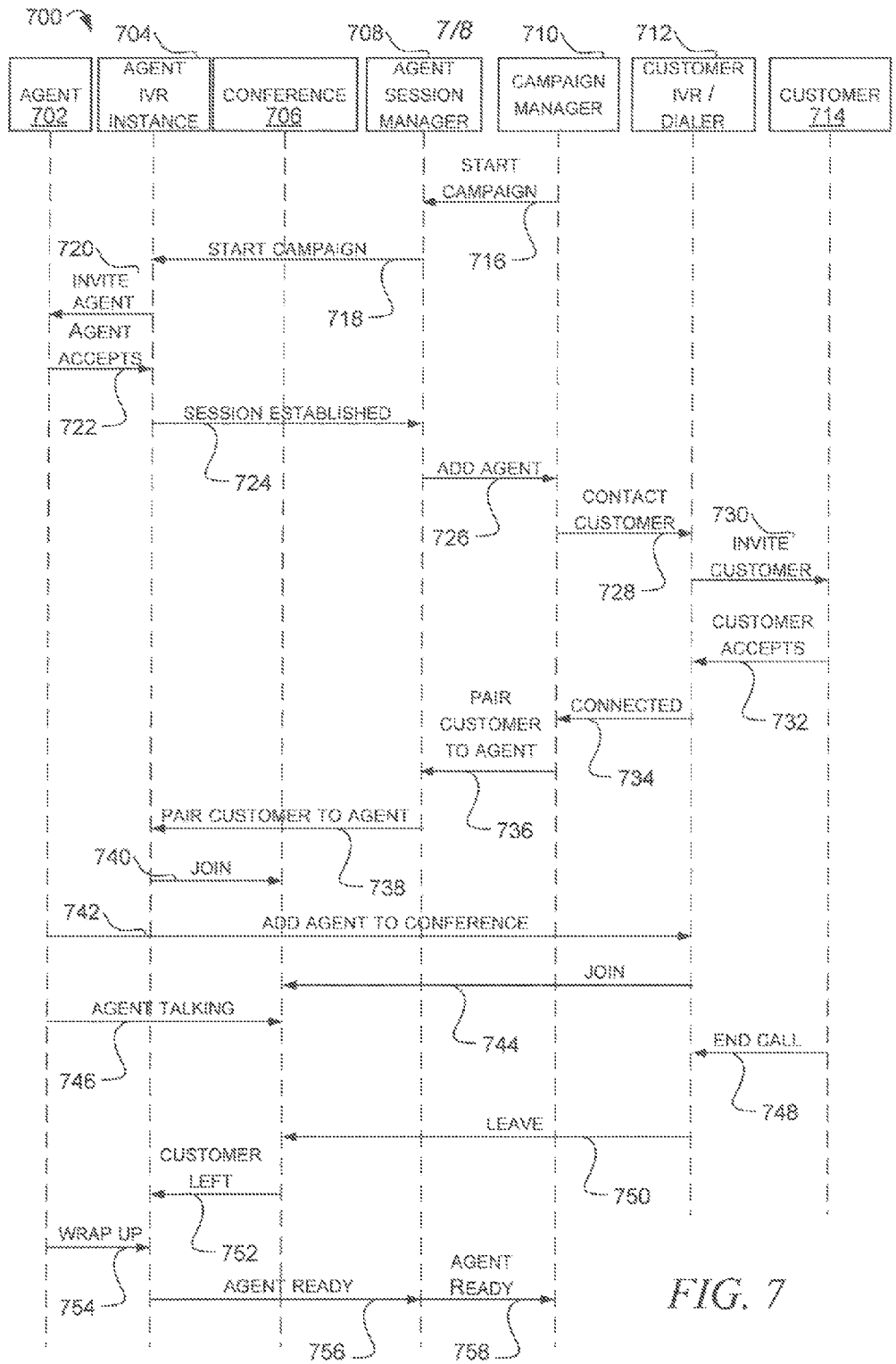
FIG. 7 is a multi-lane flowchart illustrating operations performed during a campaign, according to an example embodiment.

FIG. 7 is a multi-lane flowchart 700 illustrating operations performed during a campaign, according to an example embodiment. In the depicted multi-lane flowchart, the agent 702 may be, for example, the agent 602 using a telephone 106. The agent IVR instance 704 may be the IVR instance 610 provided by the automated interaction module 202 and the text-to-speech interface 114. The conference 706 may be the call hub 606 provided by the hub management module 210. The agent session manager 708 may be the agent management module 208 and/or the session management module 204. The campaign manager 710 may be the campaign management module 208. The customer IVR/dialer 712 may be the IVR instance 610 provided by the automated interaction module 202 and the text-to-speech interface 114. The customer 714 may be the customer 604 using a telephone 106. The conference 706, agent session manager 708, and campaign manager 710 may be provided by the call management engine 118.

At an operation 716, the campaign manager 710 sends a "start campaign" message to the agent session manager 708. The agent session manager 708 then relays the message to the agent IVR instance 704 at operation 718. In turn, at operation 720, the agent IVR instance 704 invite an agent 702 to join the campaign. At operation 722, the agent 702 accepts the invitation.

At operation 724, the agent IVR instance 704 sends a "sessions established" message to the agent session manager 708 that, in turn, notifies the campaign manager 710 to add the agent to the campaign at operation 726. The campaign manager 710, at an operation 728, then requests that the customer IVR/dialer 712 contact the customer 714. The customer IVR/dialer 712 invites the customer 714 to join the campaign at operation 730. At operation 732, the customer 714 accepts the invitation.

In an operation 734, the customer IVR/dialer 712 connects to the campaign manager 710. The campaign manager 710 then pairs the customer 714 to the agent 702 in an operation 736 and notifies the agent session manager 708. The agent session manager 708 relays the pairing to the agent IVR instance 704 in an operation 738. The agent IVR instance 704 joins the conference 706 in an operation 740. In an operation 742, a message is sent to the customer IVR/dialer 712 indicating that the agent 702 is added to the conference 706. In response, the customer IVR/dialer 712 joins the conference 706 in an operation 744.

In an operation 746, the agent 702 talks within the conference 706. In an operation 748, the customer 714 ends the call. The customer IVR/dialer 712 sends a leave message to the conference 706 in an operation 750. The conference 706 sends an indication to the agent IVR interface 704 that the customer has left in an operation 752. In an operation 754, the agent 702 and the agent INV interface 704 perform wrap-up tasks. In an operation 756, an "agent ready" indication is sent to the agent session manager 708 by the agent IVER interface 704. In an operation 758, the "agent ready" indication is relayed to the campaign manager 710.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
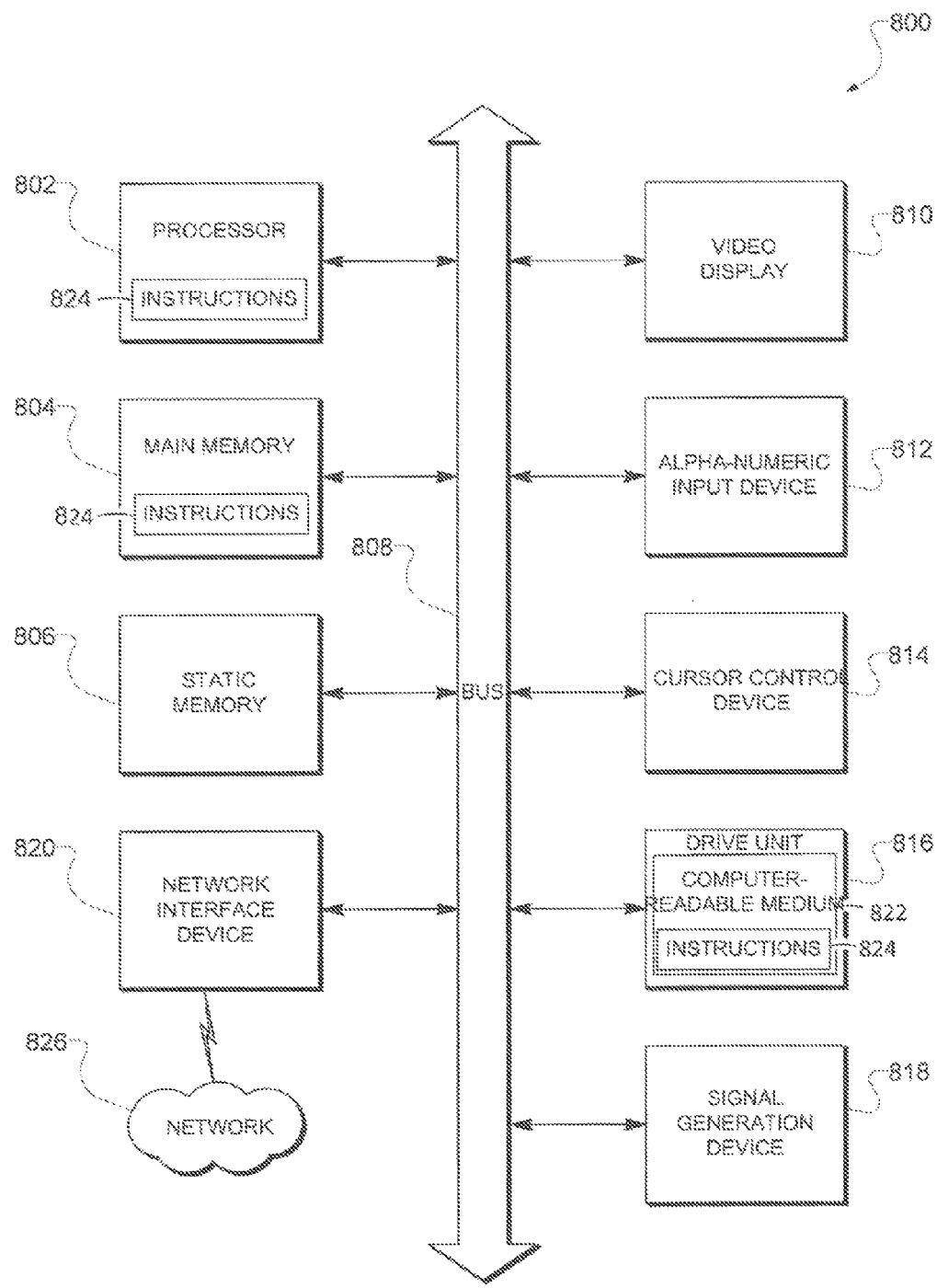
FIG. 8 is a block diagram of machine in the example form of a computer system within which a set instructions, for causing the machine to perform any one or more of the methodologies discussed herein, may be executed.

FIG. 8 is a block diagram of machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   a memory;
   one or more processors;
   a session management module stored in the memory and executed by the one or more processors configured to:
      receive a voice phone call from an agent using a telephone;
      based on the voice phone call, identify the agent; and
      establish a session with the agent via the telephone of the agent;
   an agent management module stored in the memory and executed by the one or more processors configured to manage a work state of the agent within a plurality of sequential calls between the agent and a plurality of customers, wherein the session of the agent remains established between each of the sequential calls and an agent pool capacity is adjusted when a call of the plurality of sequential calls is connected; and
   a hub management module stored in the memory and executed by the one or more processors configured to, during the call of the plurality of sequential calls between the agent and a customer of the plurality of customers:
      provide an interactive voice response (IVR) instance to the agent, the IVR instance being configured to:
         receive commands from the agent, and during a "wrap-up" state, audibly question the agent via the telephone of the agent to debrief the agent about the call with the customer;
provide a separate IVR instance to the customer of the plurality of customers, the separate IVR instance configured to:
receive network-oriented messages from the customer, and
work in conjunction with the IVR instance; and
manage a call hub, the call hub being a routing point between the IVR instance and the separate IVR instance.

2. The system of claim 1, further comprising:
a campaign management module stored in the memory and executed by the one or more processors configured to assign the agent to a campaign that defines tasks to be performed by the agent during at least a portion of the session; and wherein
the session management module is further configured to:
connect the agent to a first customer based on the campaign;
detect a termination of the connection between the agent and the first customer; and
connect the agent to a second customer based on the campaign and the termination of the connection.

3. The system of claim 2, wherein the campaign management module is configured to provide a choice of campaigns to the agent.

4. The system of claim 2, wherein the campaign management module is further to determine that the assigned campaign is complete and to assign the agent to a next campaign during the established session.

5. The system of claim 1, wherein the agent management module is further configured to connect the agent to the customer using the call hub when the work state of the agent is "ready".

6. The system of claim 1, wherein the agent management module is further configured to provide textual information about the customer to the telephone of the agent when the work state of the agent is "preview customer".

7. The system of claim 1, wherein the hub management module is further configured to join a supervisor to the call hub.

8. The system of claim 1, wherein the debriefing includes receiving one or more dual tone multi frequency (DTMF) inputs.

9. The system of claim 1, wherein the debriefing includes receiving one or more voice inputs via an automated speech recognition (ASR) interface.

10. The system of claim 1, wherein the agent management module is further to cause the session of the agent to persist for the duration of the plurality of sequential calls.

11. The system of claim 1, wherein the call hub is further configured to establish the call of the plurality of sequential calls between the agent and the customer of the plurality of customers by dialing the customer based on the agent pool capacity.

12. The system of claim 1, wherein the call hub is further configured to:
establish the call of the plurality of sequential calls between the agent and the customer of the plurality of customers by dialing the customer based on an average call duration.

13. The system of claim 1, wherein the agent pool capacity is adjusted when the call is disconnected.

14. The system of claim 1, wherein the identifying of the agent by the session management module identifies the agent based on voice commands of the agent.

15. A method comprising:
receiving a voice phone call from an agent using a telephone;
based on the voice phone call, identifying the agent;
establishing a session with the agent via the telephone of the agent;
managing, by one or more processors, a work state of the agent within a plurality of sequential calls between the agent and a plurality of customers, wherein the session of the agent remains established between each of the sequential calls and an agent pool capacity is adjusted when a call of the plurality of sequential calls is connected; and
during the call of the plurality of sequential calls between the agent and a customer of the plurality of customers:
providing an interactive voice response (IVR) instance to the agent, the IVR instance being configured to:
receive commands from the agent, and
during a "wrap-up" state, audibly question the agent via the telephone of the agent to debrief the agent about the call with the customer; and
providing a separate IVR instance to the customer of the plurality of customers, the separate IVR instance being configured to:
receive network-oriented messages from the customer, and
work in conjunction with the IVR instance; and
managing a call hub, the call hub being a routing point between the IVR instance and the separate IVR instance.

16. A non-transitory machine-readable medium having instructions embodied thereon, the instructions executable by one or more processors to perform operations comprising:
receiving a voice phone call from an agent using a telephone;
based on the voice phone call, identifying the agent;
establishing a session with the agent via the telephone of the agent;
managing, by the one or more processors, a work state of the agent within a plurality of sequential calls between the agent and a plurality of customers, wherein the session of the agent remains established between each of the sequential calls and an agent pool capacity is adjusted when a call is connected; and
during a call of the plurality of sequential calls between the agent and a customer of the plurality of customers:
providing an interactive voice response (IVR) instance to the agent, the IVR instance being configured to:
receive commands from the agent, and
during a "wrap-up" state, audibly question the agent via the telephone of the agent to debrief the agent about the call with the customer; and
providing a separate IVR instance to the customer of the plurality of customers, the separate IVR instance being configured to:
receive network-oriented messages from the customer, and
work in conjunction with the IVR instance; and
managing a call hub, the call hub being a routing point between the IVR instance and the separate IVR instance.

* * * * *